United States Patent
Bhatti et al.

(10) Patent No.: US 7,062,557 B1
(45) Date of Patent: Jun. 13, 2006

(54) WEB SERVER REQUEST CLASSIFICATION SYSTEM THAT CLASSIFIES REQUESTS BASED ON USER'S BEHAVIORS AND EXPECTATIONS

(75) Inventors: Nina T. Bhatti, Mountain View, CA (US); Allan J Kuchinsky, San Francisco, CA (US); Anna Bouch, Hove (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 09/613,007

(22) Filed: Jul. 10, 2000

(51) Int. Cl.
*G06F 15/16* (2006.01)
(52) U.S. Cl. .................. 709/226; 709/207; 709/232
(58) Field of Classification Search ............. 709/103, 709/224, 102, 202, 223, 207, 226, 232; 725/87
See application file for complete search history.

(56) References Cited

U.S. PATENT DOCUMENTS

| | | | |
|---|---|---|---|
| 5,542,088 A * | 7/1996 | Jennings et al. | 709/103 |
| 5,812,780 A * | 9/1998 | Chen et al. | 709/224 |
| 5,892,917 A * | 4/1999 | Myerson | 709/224 |
| 6,006,269 A * | 12/1999 | Phaal | 709/227 |
| 6,041,354 A * | 3/2000 | Biliris et al. | 709/226 |
| 6,055,564 A * | 4/2000 | Phaal | 709/207 |
| 6,098,091 A * | 8/2000 | Kisor | 709/202 |
| 6,571,391 B1 * | 5/2003 | Acharya et al. | 725/87 |
| 6,597,682 B1 * | 7/2003 | Kari | 370/348 |
| 6,671,724 B1 * | 12/2003 | Pandya et al. | 709/226 |
| 6,674,477 B1 * | 1/2004 | Yamaguchi et al. | 348/387.1 |
| 6,704,409 B1 * | 3/2004 | Dilip et al. | 379/265.02 |
| 6,725,455 B1 * | 4/2004 | Staiger et al. | 718/102 |

FOREIGN PATENT DOCUMENTS

EP  1113381 A1 *  7/2001

OTHER PUBLICATIONS

"Dynamic scheduling of hard real-time tasks and real-time threads" ▭▭Schwan, K.; Zhou, H.; Software Engineering, IEEE Transactions on , vol.: 18 Issue: 8 , Aug. 1992 ▭▭pp.: 736-748.*

"Evaluation of process scheduling nechanism for a Web server based on its behavior while executing" Suranauwarat, S.; Hodea, T.; Kazuo, U.; Software Engineering Conference, 1999. (APSEC '99) Proceedings. Sixth Asia Pacific , Dec. 7-10, 1999 pp.: 80-87.*

(Continued)

Primary Examiner—Paul H. Kang
(74) Attorney, Agent, or Firm—Richard P. Lange

(57) ABSTRACT

A server application system includes a server application module that performs predetermined functions in response to external user requests. The server application system further includes a characterization module coupled to receive the external user requests, and to determine a threshold for user tolerance of delay for each of the user requests. Tolerance threshold is calculated using task type, service level, and session duration. A classification module is then coupled to the characterization module to dynamically assign each of the user requests an allowable processing deadline based on the corresponding user tolerance threshold of that user request. The processing deadline specifies the time period within which the particular user request must be serviced by the server application module. A method of admitting incoming user requests to a server application is also described.

16 Claims, 6 Drawing Sheets

OTHER PUBLICATIONS

"Hard/soft deadline assignment for high workflow throughput" Jin Hyun Son; Jung Hoon Kim; Myoung Ho Kim; Database Applications in Non-Traditional Environments, 1999. (DANTE '99) Proceedings. 1999 International Symposium on , 1999 pp.: 359-365.*

Bhatti, et al, "Integrating user-perceived quality into web server design", Comp. Networks, Elsevier Science Publishers B.V., Amsterdam, NL, Jun. 2000, pp. 1-6.

Bhatti, et al, "Web server support for tiered services", IEEE network, IEEE Inc. New York, US, vol. 13, No. 5. Sep. 1999, pp. 64-71.

Bhoj, et al. "Web2k: bringing Qos to the web", Internet systems and applications Lab, HP Labs, Palo Alto, online, vol. 61, May 2000, pp. 1-20.

* cited by examiner

| USER RATING OF SERVICE QUALITY | RANGE OF LATENCY EXPERIMENTS 1 & 2 (NON-INCREMENTAL LOADING) | RANGE OF LATENCY EXPERIMENT 3 (INCREMENTAL LOADING) |
|---|---|---|
| HIGH | 0–5 sec | 0–39 sec |
| AVERAGE | > 5 sec | > 39 SEC |
| LOW | > 11 SEC | > 56 SEC |

LATENCY RATING TABLE

*Figure 3*

| USERS | SESSION DURATION |
|---|---|
| IP 1 | DURATION VALUE 1 |
| IP 2 | DURATION VALUE 2 |
| ⋮ | |
| IP n | DURATION VALUE n |

Figure 6

WEB SERVER REQUEST CLASSIFICATION SYSTEM THAT CLASSIFIES REQUESTS BASED ON USER'S BEHAVIORS AND EXPECTATIONS

BACKGROUND OF THE INVENTION

1. Field of the Invention

The present invention pertains to the Internet/Intranet systems. More particularly, this invention relates to a web server request classification system that classifies requests based on individual user's behavior and expectation.

2. Description of the Related Art

With the rapid growth of the Internet, more and more business and residential users are beginning to rely on the Internet for their mainstream and mission-critical activities. As is known, the Internet typically refers to a number of data service systems connected together via a high speed interconnect network (see FIG. 1). Each data service system typically includes Internet server applications that host contents for various customers. The data service system can also host other applications. Remote user terminals (e.g., terminals 11a–11n in FIG. 1) may be connected to a data service system (e.g., the data service system 20 in FIG. 1) via an interconnect network. Each user terminal is equipped with a web browser (or other software such as an e-mail software) that allows its user (i.e., a person) to access the contents and/or applications hosted in various data service systems through the corresponding user terminal.

Popular Internet applications include World Wide Web (WWW), E-mail, news, and FTP applications. All of these applications follow the client-server model and rely on the Transmission Control Protocol (TCP) for reliable delivery of information/applications between severs and user terminals. These applications can also be referred to as server applications. A user can access a server application (e.g., web server) by generating at least one request from a corresponding user terminal to the corresponding server application. The server application then services the request. A server application can be accessed by multiple user terminals at the same time. The server application typically serves the user requests in the first-in-first-out (FIFO) fashion.

One problem of the above-identified prior art server application is that it does not have protection mechanism against excessive load conditions. Unbearably long delays or even deadlocks may occur when the total number of user requests received by the server application at one time greatly exceeds the total number of access requests permitted by the server application (i.e., the entire system is overloaded).

Another problem is that the server application does not provide performance stabilities to its customers that host their content/service sites in the server application. This means that the prior art server application does not provide features like performance stability over a range of client demands, non-interference performance among co-hosted content sites, targeted performance, and overload protection for the hosted content sites.

To overcome these problems, prior proposals have been made to add quality-of-service (QoS) middleware in the server application. The QoS middleware classifies requests into different classes. For example, the QoS middleware classifies a request as an existing session premium request if the incoming request is part of an existing session and requires preferred treatment. If the request is part of an existing session but does not require preferred treatment, the QoS middleware can classify the request as an existing session basic request. If the incoming request is not part of an existing session, then the middleware can classify the request as a new session request.

Disadvantages are, however, still associated with this prior approach. One disadvantage is that the classification criteria does not take into account the user expectation or tolerance of latency. Studies have shown that users become less tolerate of delay as they proceed with a session. Prior art middleware provides the same treatment to each request within a class, regardless whether the request is in the earlier part or later part of a session. So if the middleware needs to send a request from a class (e.g., the existing session basic class) to the server application, the middleware will only pick one request based on the FIFO order. This means that the middleware does not give any consideration to user tolerance during its classification and scheduling. If the middleware treats a request that occurs late in a session the same way as it treats a request that occurs early in a session, the users of late-session requests may perceive unacceptably long delays although the actual latency time for all the requests is about the same.

SUMMARY OF THE INVENTION

One feature of the present invention is to improve performance and user satisfaction obtained from a server application.

Another feature of the present invention is to provide an intelligent request classification system that considers user tolerance when classifying and scheduling incoming requests to a server application.

Another feature of the present invention is to design a request classification and scheduling system for a server application that has knowledge of human behavior and expectation such that the request classification and scheduling system can act according to users' subjective expectation of the performance of the server application.

A further feature of the present invention is to dynamically assign processing deadlines to various user requests based on the assessed user tolerance values of these requests.

A still further feature of the present invention is to characterize the user expected delays in processing their user requests and then process these user requests accordingly.

A server application system includes a server application module that performs predetermined functions in response to external user requests. The server application system further includes a characterization module coupled to receive the external user requests, and to determine user tolerance threshold of each of the user requests. A classification module is then coupled to the characterization module to dynamically assign each of the user requests an allowable processing deadline based on the predicted user tolerance threshold of that user request. The processing deadline specifies the time period within which the particular user request must be serviced by the server application module.

A method of admitting incoming user requests to a server application includes the step of determining user tolerance threshold of each of the user requests. Then the user tolerance thresholds of the user requests are used to dynamically assign each of the corresponding user requests an allowable processing deadline. The processing deadline specifies the time period within which the particular user request must be serviced by the server application module.

Other features and advantages of the present invention will become apparent from the following detailed descrip-

BRIEF DESCRIPTION OF THE DRAWINGS

FIG. 3 shows different user expectations at different levels of services.

FIG. 6 shows the lookup table for session durations for various users of the server application system of FIG. 2.

DETAILED DESCRIPTION OF THE INVENTION

Figure 1:
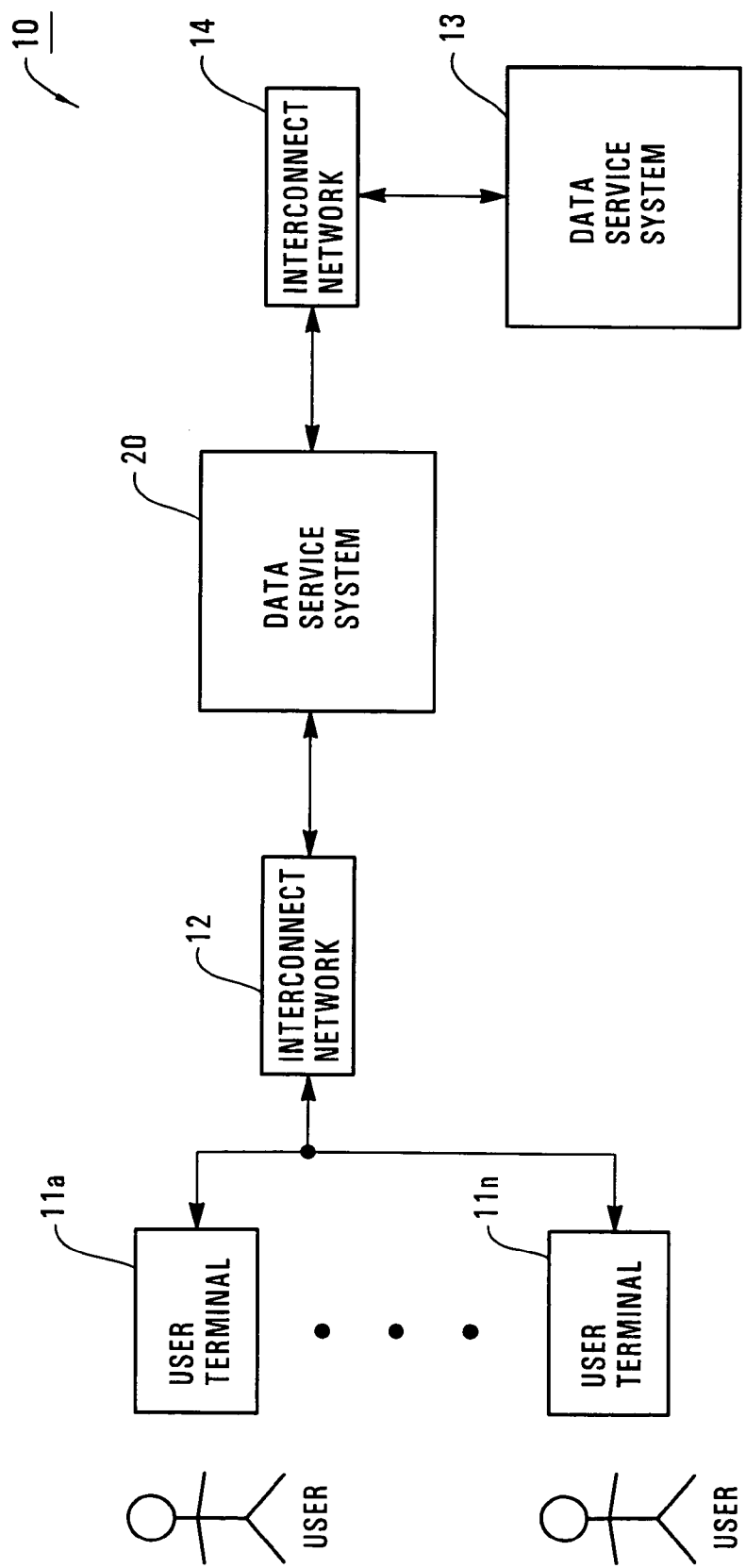
FIG. 1 schematically shows the overall structure of the Internet.
Figure 2:
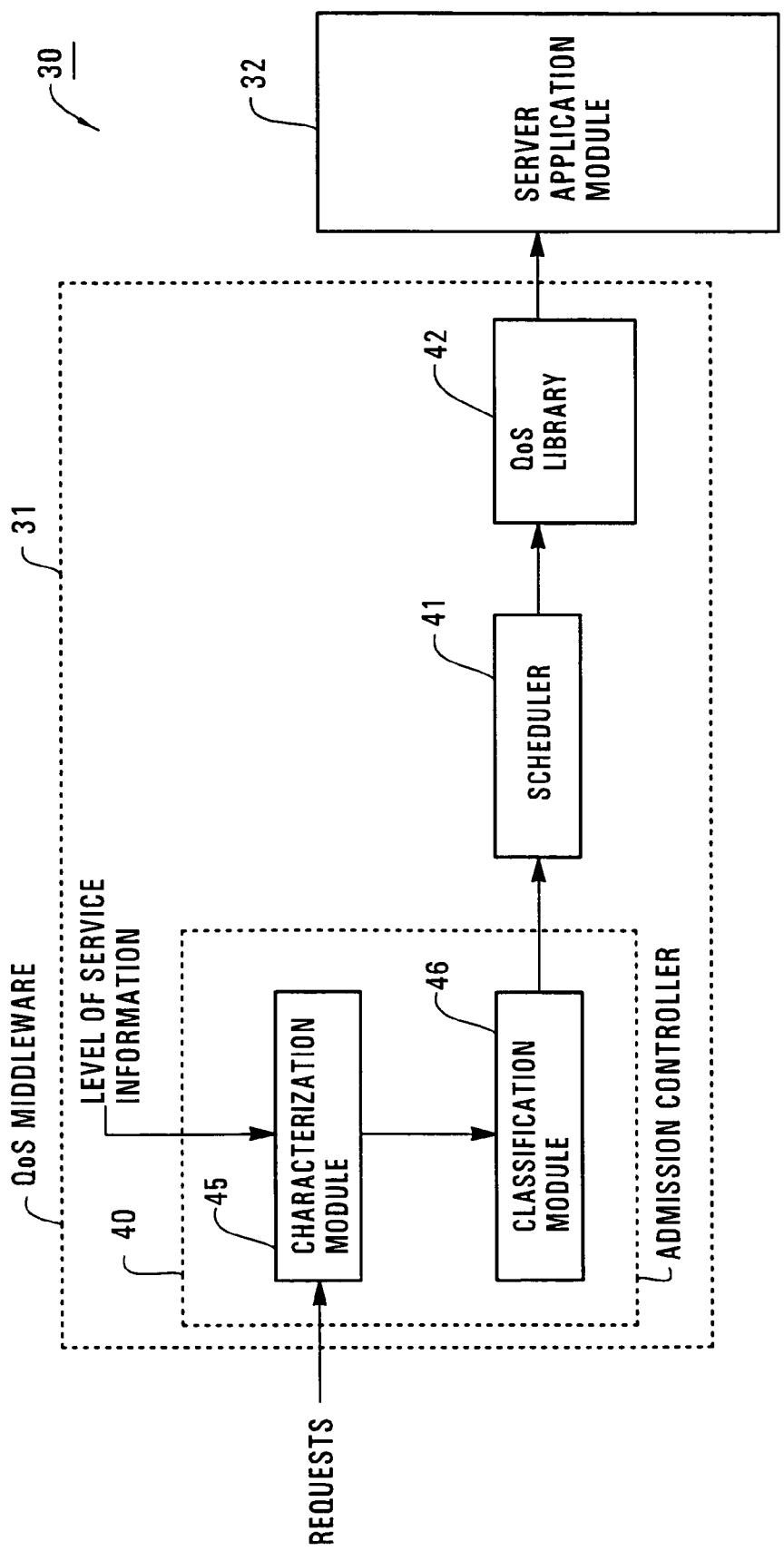
FIG. 2 shows the structure of a server application system that includes a quality-of-service (QoS) middleware that implements one embodiment of the present invention.

FIG. 2 shows a server application system 30 that includes a quality-of-service (QoS) middleware 31 that implements one embodiment of the present invention. In one embodiment, the server application system 30 is a TCP/IP-based server application system. A TCP/IP-based server application system is a connection-based client-server system. An example of such a system is a web content server, an e-mail server, a news server, an e-commerce server, a proxy server, a domain name server, and a local service server. This means that the server application system 30 can be any one of the above-mentioned servers. Alternatively, the server application system 30 is applicable to any system in which connection-oriented communication is used for data exchange.

As will be described in more detail below, the QoS middleware 31 includes a characterization module 45 that receives external user requests. The characterization module 45 then determines user tolerance threshold of each of the user requests received. The characterization module 45 determines the user tolerance threshold of a user request based on a combination of the level of service promised to the user request, the session duration of the user request, and the task type of the user request. This means that the characterization module 45 can base its determination on any one, two, or all of the above mentioned factors. The characterization module 45 can extract the session duration of the user request from a cookie of the user request, or uses either the IP address or the cookie of the user request to look for the associated session duration kept in the characterization module 45. In the latter case, the characterization module 45 increments the session duration each time the server application module 32 is accessed by the same user.

The task type means that the characterization module 45 can classify user requests into many different types based on their tasks. For example, the user requests that are just seeking information may be classified as the browsing task type user requests while the shopping user requests can be categorized as the shopping task type user requests. By the same token, the user requests that are part of some financial transactions can be classified as belonging to a transaction task type. The task type factor also indicates the user tolerance or expectation of the user requests. This is because users have different tolerance for different tasks. For example, people who are shopping may tolerate longer delays. But people may have shorter patience if they want information quickly. The task type information is determined by the characterization module 45. The different kinds of tasks and tolerances are system-specific information for a server application system. For example, a shopping site might have browsing tasks that are expected to be processed quickly, compute tasks that are expected to be slower. What is important is that these expectations are modeled by the users. It is based on what the user "believes" should be fast or slow.

The characterization module 45 then sends the user tolerance thresholds to the classification module 46. The classification module 46 then dynamically assigns each of the user requests an allowable processing deadline based on the corresponding user tolerance threshold of that user request. The processing deadline specifies the time period within which the particular user request must be serviced by the server application module 32.

The middleware 31 also includes a scheduler 41. After the processing deadlines are assigned by the classification module 46 to the respective user requests, the scheduler 41 coordinates transmission of the user requests to the server application module 32 before their respective allowable waiting time periods expire.

In summary, the key of the present invention is to equip the middleware 31 that handles request classification and scheduling with knowledge of human behavior and expectation such that the middleware 31 can act according to users' subjective expectation of the performance of the server application system 30. This means that the middleware 31 is an intelligent request classification system that can dynamically assign processing deadlines to various user requests based on their respective user tolerance thresholds. It is, however, to be noted that the present invention is not limited to be implemented by the middleware 31. For example, the present invention can be implemented in a front end load balancer that is outside of the middleware 31 or the server application system 30. In this case, the load balancer performs the admission classification and scheduling functions. The server application system 30 and the middleware 31 will be described in more detail below, also in conjunction with FIGS. 2–6.

Referring again to FIG. 2, the server application system 30 can be employed by an Internet Service Provider (ISP) to offer data services (e.g., web, news, advertisement, or e-mail) and other services (e.g., e-commerce) to users or subscribers connected to the server application system 30. Here, a customer means the entity contracting with the server application system 30 to have its content hosted in the server application system 30, or to have its services offered through the server application system 30. A user or subscriber means the entity accessing the server application system 30 through a remote user terminal via a communication network. The user can also be referred to as a client.

In general, the server application system 30 is implemented by or operates in a computer (or data processing) system with a network communication capability. For example, the server application system 30 can be implemented by or operates in a server computer system, a workstation computer system, a mainframe computer system, a notebook computer system, or any other computer system.

The server application module 32 can be any TCP/IP-based server application. As described above, a TCP/IP-based server application is a connection-based client-server. This means that the server application module 32 can be a web content server, an e-mail server, a news server, an e-commerce server, a proxy server, a domain name server, and a local service server.

The server application module 32 performs the predetermined server function of the server application system 30. For example, if the server application system 30 is a web server, the server application module 32 performs the web server function which may include hosting web content and processing requests to retrieve their web pages. The server application module 32 is implemented using any known technology. The structure of the server application module 32 is also known and dependent on the type of server it implements. Thus, the structure of the server application module 32 will not to be described in more detail below.

The server application module 32 can be a static server or dynamic server. In one embodiment, the server application module 32 is a static server that stores static files only. In another embodiment, the server application module 32 may store both static and dynamic files. As is known, web content is generally classified as static, such as a file, or dynamic, such as cgi-scripts, java-server pages (JSP) or active server pages (ASP). Dynamic content may also be generated at run-time by a back-end engine (e.g., an application server or a database engine) that is separate from the server itself.

The server application module 32 hosts content and/or applications that can be accessed by users external to the server application system 30. The server application module 32 can be of any kind of server that stores a number of content files. Each of the content files can be accessed by an access request. The server application module 32 may also include a number of content sites, each storing a number of content files for access by multiple access requests. The multiple content sites may belong to different content providers or customers. The server application module 32 stores content files or dynamic executable code/program for access by requests. Thus, the content files hereinafter refer to (1) static content files, (2) dynamic content files, and (3) executable programs/codes.

The access to the server application module 32 may be done by a user at an external user terminal (not shown in FIG. 2) who generates and sends at least one request directed at the server application module 32. Alternatively, an access request may be generated by a server application system wanting to access the server application system 30.

Incoming requests to the server application module 32 are first received in the middleware 31 from an external TCP listen queue (not shown in FIG. 2) before they are sent to the server application module 32 for servicing. The external TCP listen queue is within the operating system (also not shown) of the computer system (also not shown) that runs the server application system 30. The external TCP listen queue stores the incoming requests before they are processed by the server application system 30.

The server application module 32 can process multiple requests at the same time. However, the server application module 32 has limits on the number of requests it can process per second. The processing limits also depend on the processing power of the server application module 32.

The middleware 31 includes a Quality-of-Service (QoS) library 42, which serves as the interface of the QoS middleware 31 to the server application module 32. The QoS library 42 is invoked by the server application module 32 to receive an access request for one of the content sites hosted by the server application module 32. The QoS library 42 also monitors traffic through each of the content sites in the server application module 32 and shares the traffic information with other components of the middleware 31. The QoS library 42 can be implemented using known technology. Alternatively, the middleware 31 does not include the QoS library 42.

In addition and as can be seen from FIG. 2, the middleware 31 also includes an admission controller 40 and a scheduler 41. The admission controller 40 further includes a characterization module 45 and a classification module 46, each of which can be implemented using known technology. For example, each of the modules 45–46 can be implemented using known software, hardware, or firmware technology. The characterization module 45 receives the user requests from the external TCP listen queue (not shown in FIG. 2). The characterization module 45 is used to determine the user tolerance threshold of each of the user request received. This will be described in more detail below.

The characterization module 45 determines the user tolerance level or threshold based on one or more factors. These factors include the level of service promised to the user, the session duration of the user request, the task type of the user request. The characterization module 45 can calculate the user tolerance threshold of a user request based on one of the above-mentioned factors, or a combination of the factors (e.g., two or three of the factors). Using these factors, the characterization process of the characterization module 45 also takes into consideration of users' subjective expectations of the performance of the server application module 32 with respect to their user requests. This will be described in more detail below. The assigned threshold can be in the form of time (e.g., seconds). The characterization module 45 then sends the characterized user request to the scheduler 41.

The levels of service promised to users can be of, for example, two levels (i.e., premium and basic). The levels can also be more than two levels. For example, the levels can be premium, intermediary, and basic. Each user is assigned with a level of service (e.g., either premium or basic), which results in all user requests from a single user to receive the same level of service (e.g., premium or basic).

For each level of service, the characterization module 45 can determine the corresponding user tolerance level by assigning a predetermined tolerance threshold to the level. The predetermined tolerance threshold for each service level can be arbitrarily set, or based on scientific survey study of the users. FIG. 3 shows one study. As can be seen from FIG. 3, most users rate service quality as high (i.e., good) when the latency is below five seconds (for non-incremental loading) while rating any latency of more than eleven seconds as low (i.e., bad). In this case, the five second threshold can be assigned to the premium user requests while the eleven second threshold can be assigned to the basic user requests.

Referring back to FIG. 2, the session duration of the user request factor means that the characterization module 45 assigns a user tolerance threshold to a user request based on the session duration of that user request. This means that the characterization module 45 assigns the user tolerance threshold to the user requests based on their session durations. Session is defined as a series of accesses from a single user for a task or transaction. The session length or duration means the number of accesses from a single user accessing a site at the server application module 32.

Figure 4:
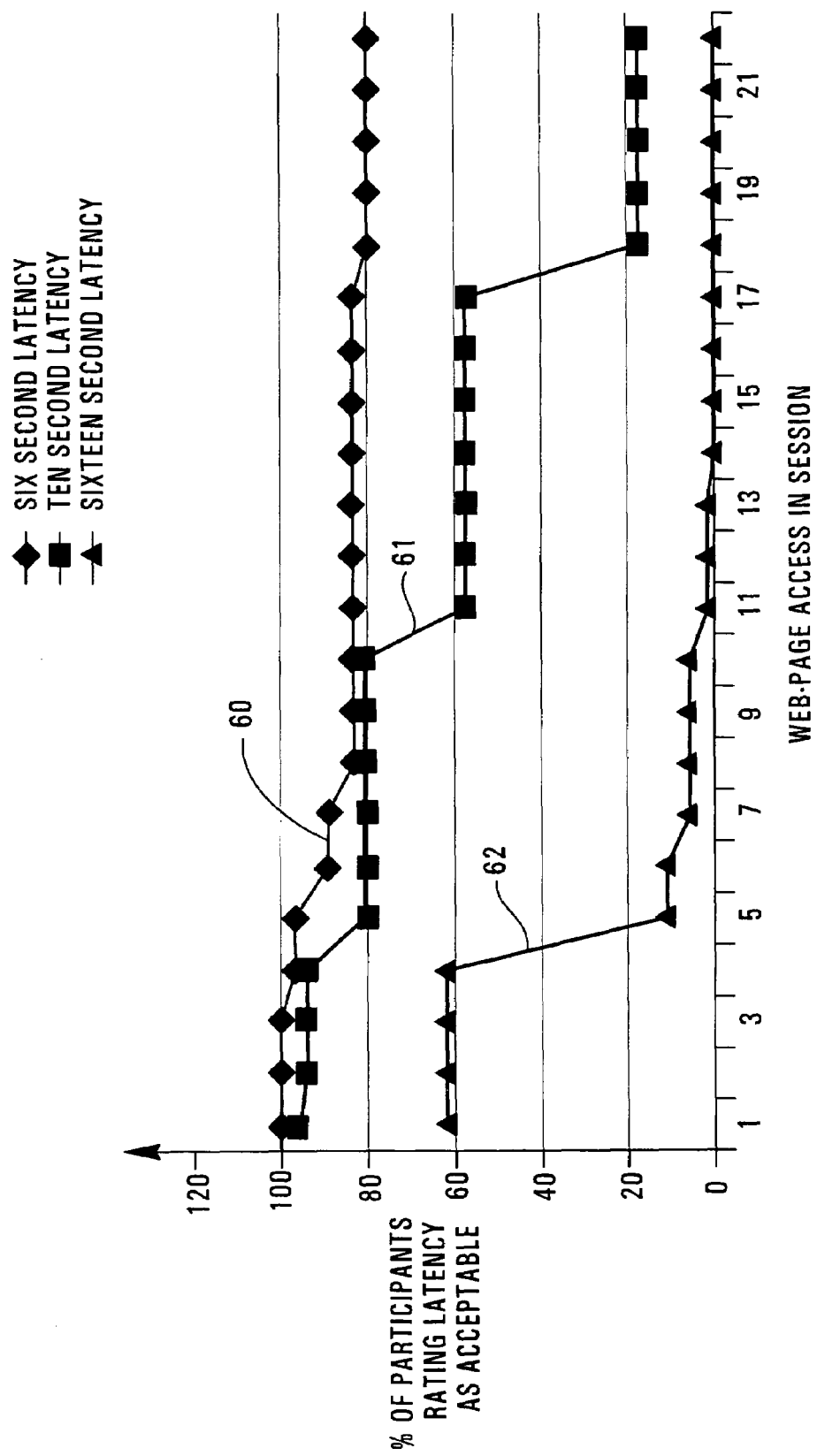
FIG. 4 shows the finding that users' tolerance for latency decreases over the duration of interaction with a web site.

This session duration measurement is very indicative of user tolerance. A central finding in a user tolerance survey is that users' tolerance for latency decreases over the duration of interaction with a site. FIG. 4 shows that finding. In FIG. 4, the curve 60 represents six second latency. The curve 61 represents ten second latency. The curve 62 represents sixteen second latency. As can be seen from FIG. 4, the effect of users' decreased tolerance for latency as session duration increases is apparent for both relatively low and relatively high levels of delay. A sixteen second latency is acceptable to 60% participants during the first four web page accesses, but not acceptable to anyone for accesses over the thirteenth page. This is extremely significant, as e-commerce sites generally have a fairly involved site where a transaction is composed of many web page accesses. A six-second latency was rated as acceptable for all participants until the third page access and then the number of users that rated it as acceptable declines steadily to 80% for twenty or more accesses.

If an e-commerce site wishes to make its site performance acceptable, then the site must improve the latency of a particular user over the duration of a session. This means that the characterization module 45 of FIG. 2 needs to reduce latency of a user request as its session length increases. If a user request has a relatively long session duration, the characterization module 45 needs to assign a user tolerance threshold with shorter waiting time.

Referring back to FIG. 2, the characterization module 45 determines the session duration or session length of a user request from the user request itself. There are many ways that the characterization module 45 can determine the session length of the user request. In one embodiment, the characterization module 45 can extract the session duration information of the user request from a cookie set within the user request. In this case, because the cookie is used to identify the same user and contains a time stamp that is incremented every time the same user accesses the same site hosted by the server application module 32, the session duration information is extracted from the cookie. In another embodiment, the characterization module 45 maintains a session duration information for each user accessing a site within the server application module 32. When a user request from a user is received, the characterization module 45 increments the session duration of the corresponding user. When the characterization module 45 needs to determine the session duration of a user request, the characterization module 45 uses either the IP (Internet Protocol) address of the user request or a cookie containing the identity of the user to retrieve the relevant information. Both of the IP address and the cookie identify the user of a particular user request. Alternatively, other ways can be used to identify user requests. For example, the user requests can be identified by unique cookies. The unique cookies are needed for the server application systems that also use proxy servers, or when the user requests are generated behind firewalls. FIG. 6 shows how the session duration information is stored in the characterization module 45.

As can be seen from FIG. 6, the session duration information is stored in the characterization module 45 in a lookup table (e.g., table 90) format. As can be seen from FIG. 6, the users field 91 has many entries based on the IP addresses (i.e., IP1, IP2, . . . IPn). The session duration field 92 has entries for session duration values, each corresponding to one IP address. When the characterization module 45 needs to know the session duration of a user request, the characterization module 45 uses the IP address to locate the corresponding session duration value in the lookup table. Alternatively, the IP address can be replaced with cookies (since cookies also identify the users rather than individual user requests).

The classification module 46 is used to assign the allowable processing deadline (i.e., the allowable waiting time or latency) to each user request based on the user tolerance threshold of the respective user request. As described above, the allowable processing deadline specifies the allowable time period within which the user request must be serviced by the server application module 32. The classification module 46 then sends the classified user requests to the scheduler 41.

The scheduler 41 is used to store the user requests that have been characterized and classified by the admission controller 40. This means that each of these user requests received by the scheduler 41 has a processing deadline threshold that specifies the allowable waiting time for that user request. The scheduler 41 then coordinates transmission of the user requests to the server application module 32 before their respective allowable waiting time periods expire. The scheduler 41 does this in connection with the resource limitations of the server application module 32. Thus, if the allowable waiting time for a user request is expiring and the server application module 32 does not have any resource to process this particular user request, one approach the scheduler 41 can have is to discard the user request and close the connection of that request. The scheduler 41 can also put that request in a discard queue (not shown) to see if the resources of the server application module 32 can be freed up in the next one or two processing cycles. The scheduler 41 can be implemented using known technology.

Figure 5:
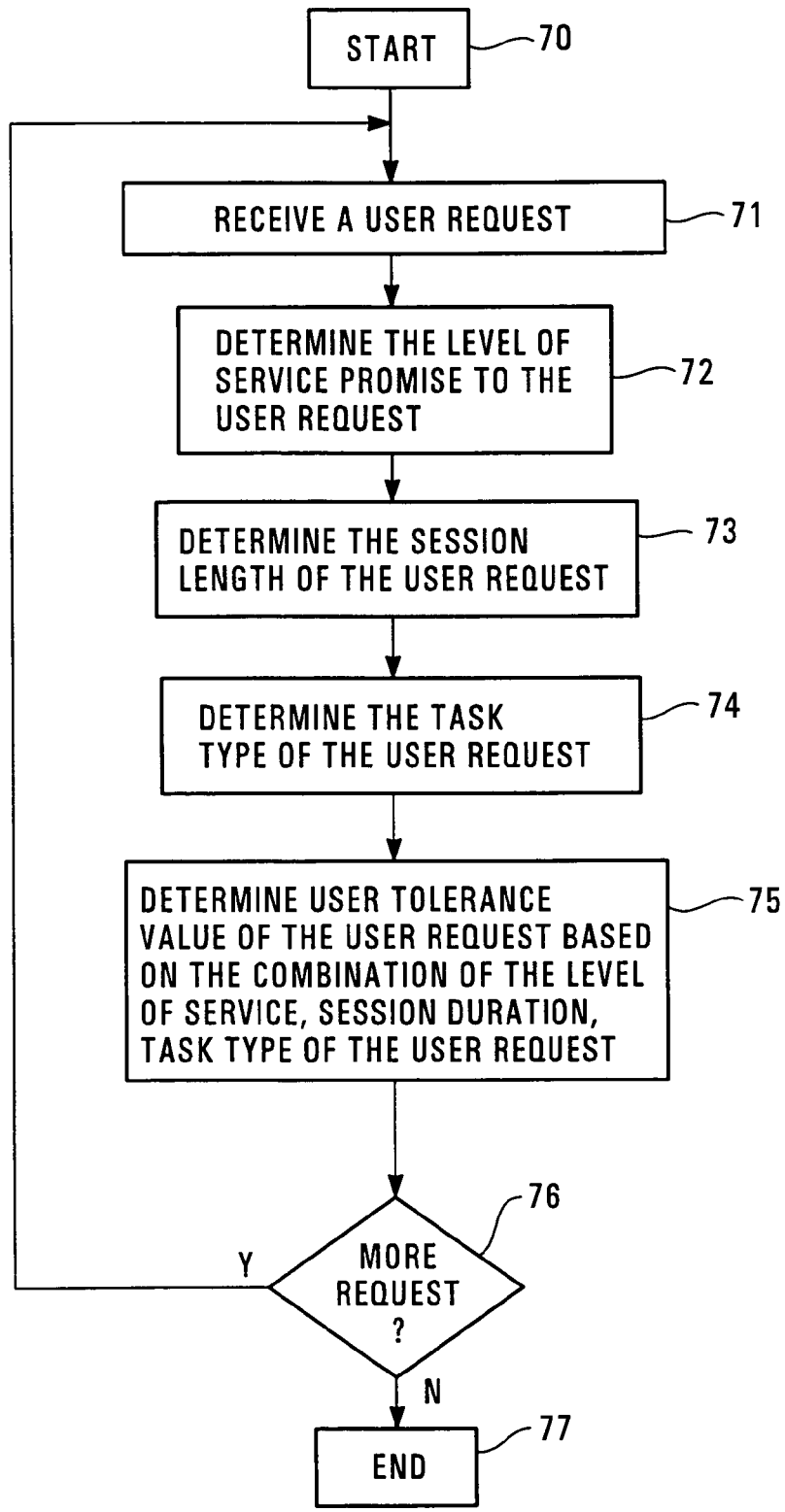
FIG. 5 is a flowchart diagram showing the process of the characterization module of FIG. 2.

FIG. 5 shows a flowchart diagram from the process of the characterization module 45 in characterizing a user request received. As can be seen from FIG. 5, the process starts at the step 70. At the step 71, the characterization module receives a user request. At the step 72, the characterization module 45 determines the level of service promised to the user request. Alternatively, the characterization module 45 does not perform this step. At the step 73, the characterization module 45 determines the session duration of the user request. Alternatively, the characterization module 45 does not perform this step. At the step 74, the characterization module 45 determines the task type of the user request. Again and alternatively, the characterization module 45 does not perform this step. At the step 75, the characterization module 45 determines the user tolerance level of the user request based on one, some, or all of the factors. Then at the step 76, the process determines if more requests have been received by the characterization module 45. If so, the process returns to the step 71. If not, the process ends at the step 77.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A server application system, comprising:
   a server application module that performs predetermined functions in response to external user requests;
   a characterization module coupled to receive the external user requests, and to determine user tolerance threshold of each of the user requests, and
   a classification module coupled to the characterization module to dynamically assign each of the user requests an allowable processing deadline based on the corresponding user tolerance threshold of that user request, wherein the processing deadline specifies the time period within which the particular user request must be serviced by the server application module.

2. The server application system of claim 1, further comprising a scheduler that coordinates transmission of the user requests to the server application module before their respective allowable waiting time periods expire.

3. The server application system of claim 1, wherein the characterization module determines the user tolerance of a user request based on a combination of the level of service promised to the user request, the session duration of the user request, and the task type of the user request.

4. The server application system of claim 3, wherein the characterization module extracts the session duration of the user request from a cookie contained in the user request.

5. The server application system of claim 3, wherein the characterization module uses either the IP address or the cookie of the user request to look for the associated session duration kept in the characterization module, wherein the characterization module increments the session duration each time the server application system is accessed by the user who generated the user request.

6. The server application system of claim 5, wherein the characterization module uses the source IP address, the destination IP address, or a combination of both to look up the session duration.

7. A server application system of claim 1, wherein a session duration of the user request is used to assign the allowable processing deadline.

8. A method of admitting incoming user requests to a server application, comprising:
   determining user tolerance threshold of each of the user requests;
   dynamically assigning each of the user requests an allowable processing deadline based on the corresponding user tolerance threshold of that user request, wherein the processing deadline specifies the time period within which the particular user request must be serviced by the server application module.

9. The method of claim 8, further comprising the step of transmitting the user requests to the server application module before their respective allowable waiting time periods expire.

10. The method of claim 9, wherein the step of determining user tolerance of a user request is based on a combination of the level of service promised to the user request, the session duration of the user request, and the task type of the user request.

11. The method of claim 10, wherein the step of determining user tolerance further comprises the step of extracting the session duration of the user request from a cookie of the user request.

12. The method of claim 10, wherein the step of determining user tolerance further comprises the steps of
   creating a session duration for a user and incrementing a session duration for a user each time the server application is accessed by the user;
   using either the IP address or the cookie of a user request to look for the associated session duration kept in the server application.

13. The method of claim 12, wherein the IP address used to look for the associated session duration kept in the server application uses source IP address, the destination IP address, or a combination of both to look up the session duration.

14. The method of claim 10, wherein the step of determining user tolerance of a user request further comprises the step of determining the task type of the user request.

15. The method of claim 10, wherein the step of determining user tolerance further comprises the step of determining the level of service promised to the user request.

16. The method of claim 8, wherein a session duration is used for assigning the allowable processing deadline.

* * * * *